United States Patent
Schneider et al.

(10) Patent No.: US 10,824,927 B1
(45) Date of Patent: Nov. 3, 2020

(54) SYSTEMS, METHODS AND COMPUTER READABLE MEDIUM FOR MANAGEMENT OF DATA BUFFERS USING FUNCTIONAL PARADIGM

(71) Applicant: Enernet Global, LLC, New York, NY (US)

(72) Inventors: Stephen Schneider, Stamford, CT (US); Brian Gardner, Geneva (CH)

(73) Assignee: Enernet Global, LLC, New York, NY (US)

( * ) Notice: Subject to any disclaimer, the term of this patent is extended or adjusted under 35 U.S.C. 154(b) by 0 days.

(21) Appl. No.: 16/578,337

(22) Filed: Sep. 21, 2019

Related U.S. Application Data

(60) Provisional application No. 62/734,452, filed on Sep. 21, 2018.

(51) Int. Cl.
| | |
|---|---|
| *H04L 12/50* | (2006.01) |
| *G06K 19/06* | (2006.01) |
| *H04L 12/70* | (2013.01) |
| *H04L 12/64* | (2006.01) |

(52) U.S. Cl.
CPC .......... *G06K 19/06037* (2013.01); *H04L 2012/5678* (2013.01); *H04L 2012/6489* (2013.01)

(58) Field of Classification Search
CPC ..... H04J 2203/0098; H04L 2012/6489; H04L 2012/5678; H04L 1/1835
USPC .......................................... 370/378; 345/543
See application file for complete search history.

(56) References Cited

U.S. PATENT DOCUMENTS

| | | | | |
|---|---|---|---|---|
| 5,377,339 A * | 12/1994 | Saito | ..................... | G06F 9/3808 712/212 |
| 5,613,069 A * | 3/1997 | Walker | .................... | H04L 45/00 370/355 |
| 6,813,265 B1 * | 11/2004 | Henrion | .................. | G06F 13/36 370/378 |
| 8,681,166 B1 * | 3/2014 | Chalil | ..................... | G06F 12/02 345/543 |
| 2019/0132082 A1 * | 5/2019 | Ma | ..................... | H03M 31/1185 |

* cited by examiner

*Primary Examiner* — Daniel A Hess
(74) *Attorney, Agent, or Firm* — Law Office of John Stattler

(57) ABSTRACT

A computer-implemented method, data processing system and computer readable medium manages processing of data entries in a data buffer. Data entries are stored in a data buffer. A representation of a two-directional matrix is annotated to mark the data arrivals as a plurality of entries. In addition, the two-directional matrix is annotated to define a valid processing period for the data entries. The data entries in the data buffer are processed by removing the data entries from the data buffer, marked for processing in the two-dimensional matrix during the valid processing period, by annotating the matrix, labeled as $A_{CS}$, to define the number of available entries as a cumulative sum along the columns, A-X, such that $A_{CS}$=cumsum(A-X), where 'cumsum' is the cumulative column-sum. Finally, the data entries from the data buffer are processed to determine the entries removed from the data buffer as defined by the row-sum of X. The technique has application for implementing a buffer management system for tax loss carry forward calculations.

20 Claims, 13 Drawing Sheets

$$A = $$

|  | T1 | T2 | T3 | T4 | T5 | T6 | T7 | T8 | T9 | ... |
|---|---|---|---|---|---|---|---|---|---|---|
| d1 | 0 | 0 | 0 | 0 | 0 | 0 | 0 | 0 | 0 | : |
| d2 | 0 | 20 | 0 | 0 | 0 | 0 | 0 | 0 | 0 | : |
| d3 | 0 | 0 | 0 | 0 | 0 | 0 | 0 | 0 | 0 | : |
| d4 | 0 | 0 | 0 | 0 | 0 | 0 | 0 | 0 | 0 | : |
| d5 | 0 | 0 | 0 | 0 | 1 | 0 | 0 | 0 | 0 | : |
| d6 | 0 | 0 | 0 | 0 | 0 | 0 | 0 | 0 | 0 | : |
| d7 | 0 | 0 | 0 | 0 | 0 | 0 | 0 | 0 | 0 | : |

Data Queue (Arrivals) / Time Period

$$D = \begin{array}{c|ccccccc}
 & S1 & S2 & S3 & S4 & S5 & S6 & S7 \\
\hline
Y1 & 1 & 0 & 0 & 0 & 0 & 0 & 0 \\
Y2 & 1 & 1 & 0 & 0 & 0 & 0 & 0 \\
Y3 & 1 & 1 & 1 & 0 & 0 & 0 & 0 \\
Y4 & 0 & 1 & 1 & 1 & 0 & 0 & 0 \\
Y5 & 0 & 0 & 1 & 1 & 1 & 0 & 0 \\
Y6 & 0 & 0 & 0 & 1 & 1 & 1 & 0 \\
Y7 & 0 & 0 & 0 & 0 & 1 & 1 & 1 \\
Y8 & 0 & 0 & 0 & 0 & 0 & 1 & 1 \\
Y9 & 0 & 0 & 0 & 0 & 0 & 0 & 1 \\
\vdots & \vdots & \vdots & \vdots & \vdots & \vdots & \vdots & \vdots \\
\end{array}$$

(Rows: Tax Year; Columns: Withdrawal Streams)

FIG. 8

$$A = \begin{array}{c|ccccccc}
 & S1 & S2 & S3 & S4 & S5 & S6 & S7 \\
\hline
Y1 & 0 & & & & & & \\
Y2 & & 20 & & & & & \\
Y3 & & & 0 & & & & \\
Y4 & & & & 0 & & & \\
Y5 & & & & & 4 & & \\
Y6 & & & & & & 0 & \\
Y7 & & & & & & & 0 \\
Y8 & & & & & & & \\
Y9 & & & & & & & \\
\end{array}$$

Loss Streams

|  | Y1 | Y2 | Y3 | Y4 | Y5 | Y6 | Y7 | Y8 | Y9 | ... |
|---|---|---|---|---|---|---|---|---|---|---|
| S1 | $x_{1,1}$ | $x_{1,2}$ | $x_{1,3}$ | | | | | | | |
| S2 | | $x_{2,2}$ | $x_{2,3}$ | $x_{2,4}$ | | | | | | |
| S3 | | | $x_{3,3}$ | $x_{3,4}$ | $x_{3,5}$ | | | | | |
| S4 | | | | $x_{4,4}$ | $x_{4,5}$ | $x_{4,6}$ | | | | |
| S5 | | | | | $x_{5,5}$ | $x_{5,6}$ | $x_{5,7}$ | | | |
| S6 | | | | | | $x_{6,6}$ | $x_{6,7}$ | $x_{6,8}$ | | |
| S7 | | | | | | | $x_{7,7}$ | $x_{7,8}$ | $x_{7,9}$ | |

Tax Year (rows: Y1–Y9), Withdrawal Streams (columns: S1–S7)

FIG. 10

$$A - X = \begin{array}{c|c|c|c|c|c|c|} & Y1 & Y2 & Y3 & Y4 & Y5 & Y6 \\ \hline S1 & 0-x_{1,1} & 0-x_{1,2} & 0-x_{1,3} & 0 & 0 & 0 \\ \hline S2 & 0 & 20-x_{2,2} & 0-x_{2,3} & 0-x_{2,4} & 0 & 0 \\ \hline \end{array}$$

Cumulative sum ($A_{CS}$) must be greater than zero ↑

SYSTEMS, METHODS AND COMPUTER READABLE MEDIUM FOR MANAGEMENT OF DATA BUFFERS USING FUNCTIONAL PARADIGM

RELATED APPLICATIONS

The present Application claims priority under 35 U.S.C. § 119 to Provisional Application No. 62/734,452, entitled "Management of Data Buffers Using Functional Paradigm", filed Sep. 21, 2018, inventors, Stephen Schneider and Brian Gardner, and is incorporated herein by reference in its entirety.

BACKGROUND

Field

The present invention relates to the field of data processing, and more particularly towards managing processing of data entries.

Background

Data processing systems must solve complex problems associated with prioritization of computational resources, such as processing data in a queue. For example, some data processing systems receive serial data entries for processing. Often, these data entries are stored in computer memory (e.g., data buffer) while awaiting processing. For example, some data processing systems receive input data entries, originating from different data sources associated with different processes, and the data processing systems must prioritize the tasks for processing. Simple dispatch policies, such as first-in-first out (FIFO) and last-in-first out (LIFO) define a priority for processing of data entries. However, these simple rules and do not take into account complexities that define relationships among the data entries. For example, some data entries may have constraints that require processing within a specified time period. Moreover, the constraints, for certain applications, may become very complex.

Constructing individual programs to implement each complex application used in a data processing system is cumbersome and expensive. What is needed, as set forth herein, is a "functional paradigm" that incorporates the flexibility to implement prioritization of data entries, which take into account complex rules for data processing, within a predefined framework. Using this framework, applications need only set forth constraints, and the functional paradigm software will manage the processing of data entries in accordance with those constraints.

BRIEF DESCRIPTION OF THE DRAWINGS

FIG. 2 illustrates a two-dimensional matrix for a representation of example data arrivals.

FIG. 3 depicts a two-dimensional matrix used to annotate data entries.

FIG. 4 illustrates a matrix "X" that defines the removals from the queue.

FIG. 8 illustrates a withdrawal matrix, D, that defines the valid periods to offset revenue with losses.

FIG. 9 illustrates an example diagonal matrix, A, filled with arrivals in the queue.

FIG. 10 illustrates an example matrix, X, as the variable matrix defining the withdrawal amount from the cash flow streams.

FIG. 11 illustrates an example matrix, $A_{CS}$, that defines the available funds in each stream.

DETAILED DESCRIPTION

Figure 1:
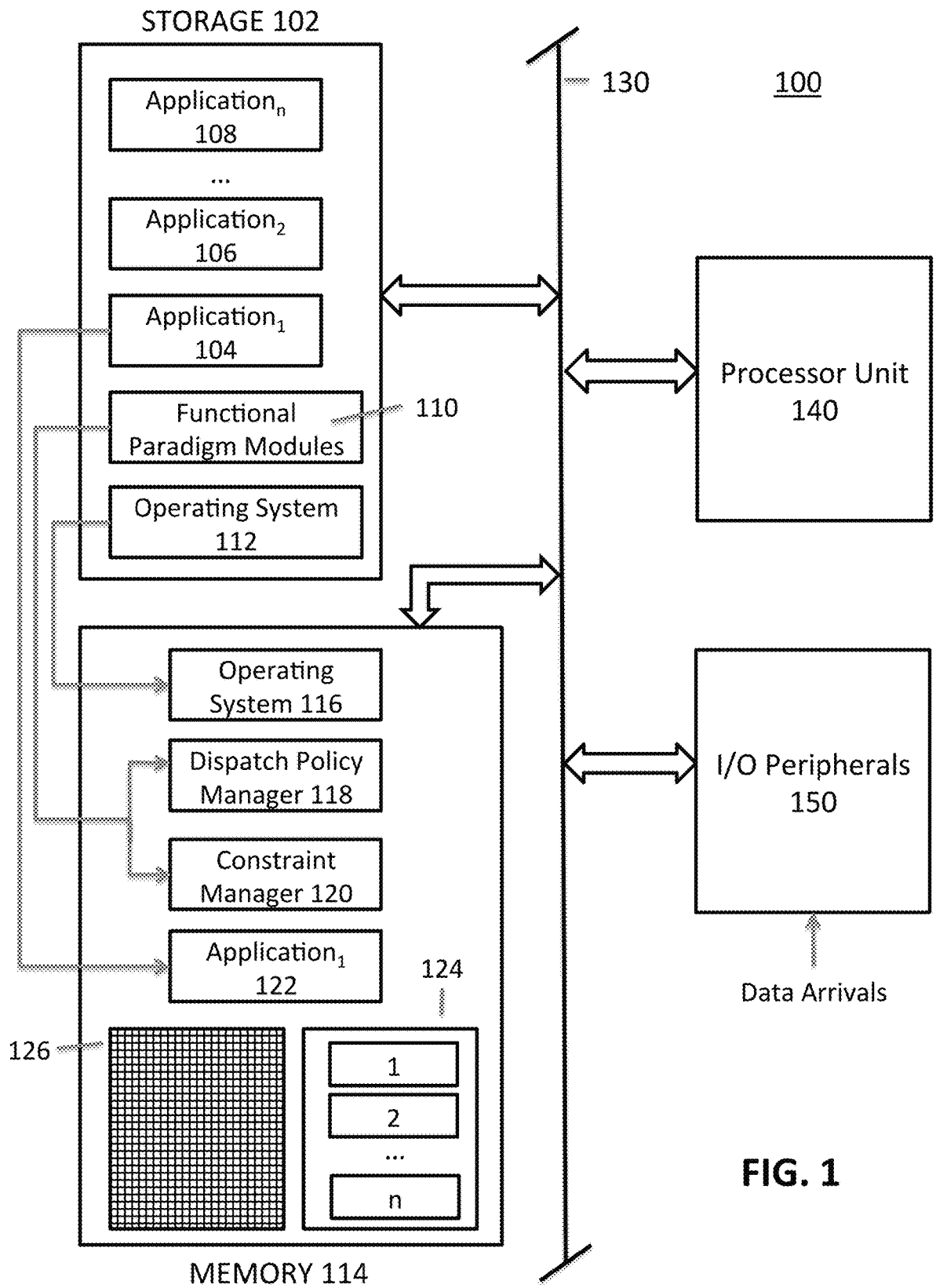
FIG. 1 is a block diagram of a data processing system exemplary to implement embodiments disclosed herein.

FIG. 1 is a block diagram of a data processing system exemplary to implement embodiments disclosed herein. In its simplest form, data processing system 100 receives data (data arrivals) at input/output (I/O) peripherals 150, stores data arrivals in memory (114) or storage (102), processes data entries via processor unit (140), and potentially outputs data through one or more I/O peripherals 150. Processor unit 140 may be configured to include one or more processors (i.e., a single or multi processor system). As shown in FIG. 1, processor unit 140 uses bus 130 to execute protocols and transfer data among storage 102/memory 114, as well as I/O peripherals 150. Preferably, storage 102 represents permanent memory, such as a hard drive or flash drives, typically used in computer systems to store data without power requirements. Memory (114) represents a broad class of media, such as high-speed DRAM, used to store data during active data processing.

For the exemplary embodiments disclosed in FIG. 1, storage 102 stores one or more application programs (e.g., stores "n" programs), labeled application$_1$ (104), application (106) and application$_n$ (108). As is well understood, application programs (software), run on the data processing system (100) to provide functionality to the user. For example, application$_1$ (104) may represent a spreadsheet program or a complex scheduling program. In one embodiment, one of the application programs (104, 106 or 108) comprises a tax management program that solves complex tax loss carry forward problems. Further details regarding an embodiment for an application program that solves tax loss carry forward problems is described more fully below.

The data processing system (100) further includes operating system (112), located in storage (102). Operating system 112 is intended to represent a broad class of utility software necessary to run the operations of a computer, such as data processing system (100). Storage (102) also stores functional paradigm modules (110). In general, functional paradigm modules (110) run on data processing system (100) to implement the embodiments of managing data buffers using a functional paradigm, as described herein.

For the exemplary embodiments shown in FIG. 1, memory (114) stores operating system (116), to represent that at least a portion of the operating system is loaded into active memory. The functional paradigm modules (110), loaded into memory (114), dispatch policy manager (118) and constraint manager (120). Similarly, also depicted as resident in memory (114), is one or more active applications, such as application program (122), shown as "application₁." Furthermore, the exemplary embodiment of memory (114) includes a two dimensional matrix (126) and data buffers (124). Data buffers (124) store data entries received, by way of example, I/O peripherals 150 awaiting processing by the processor unit 140. In general, and as described more fully below, the dispatch policy manager (118) and constraint manager (120) receive parameters from application 122, and, in turn, implement/schedule processing of data entries in data buffers (124), using two-dimensional matrix (126), in accordance with the constraints imposed by application (122).

Data arrivals are represented as information queues in a matrix, corresponding to the time in which the data arrived. FIG. 2 illustrates a two-dimensional matrix for a representation of example data arrivals. For this example, in (d2, T2), 20 data units arrived in the time period T2 and is named as 'd2'.

Figure 3:
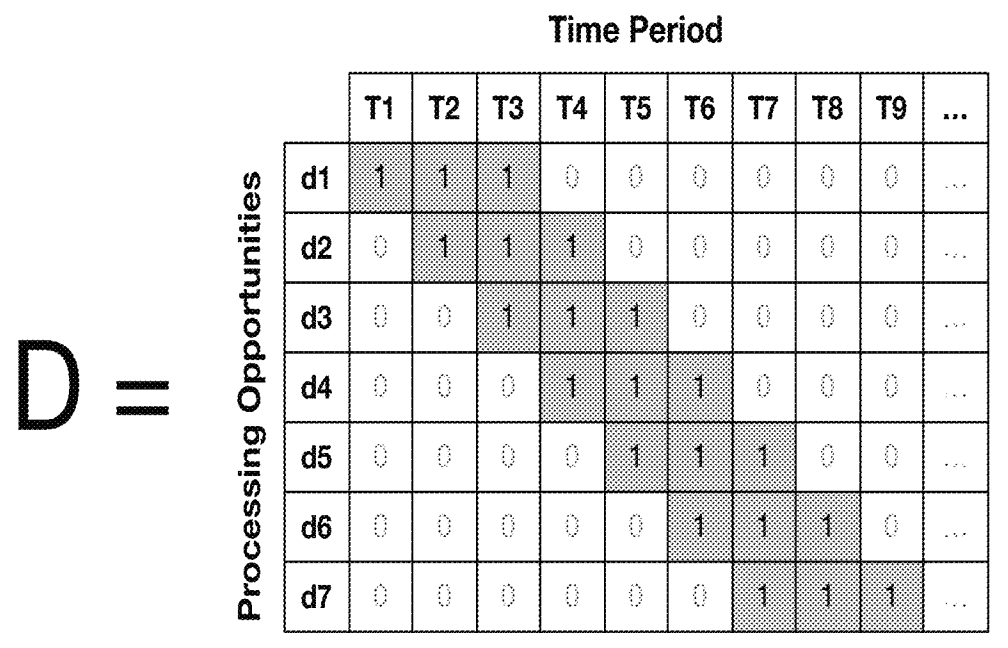

The process then arranges the data to define the valid processing periods. FIG. 3 depicts a two-dimensional matrix used to annotate data entries. Specifically, FIG. 3 illustrates the data entries in the shaded boxes of matrix D. Values of 1 indicate that a data entry in the queue may be processed (i.e., the data entry is valid in the processing period). The D matrix may also be formed from a $D_{MAX}$ matrix, which specifies maximum withdrawals in that period. Non-zero $D_{MAX}$ values are is in D. In other embodiments, D is banded, and a time-expiration is placed on data processing. If D is upper triangular with all 1s, queues will be allowed to accumulate indefinitely.

Figure 4:
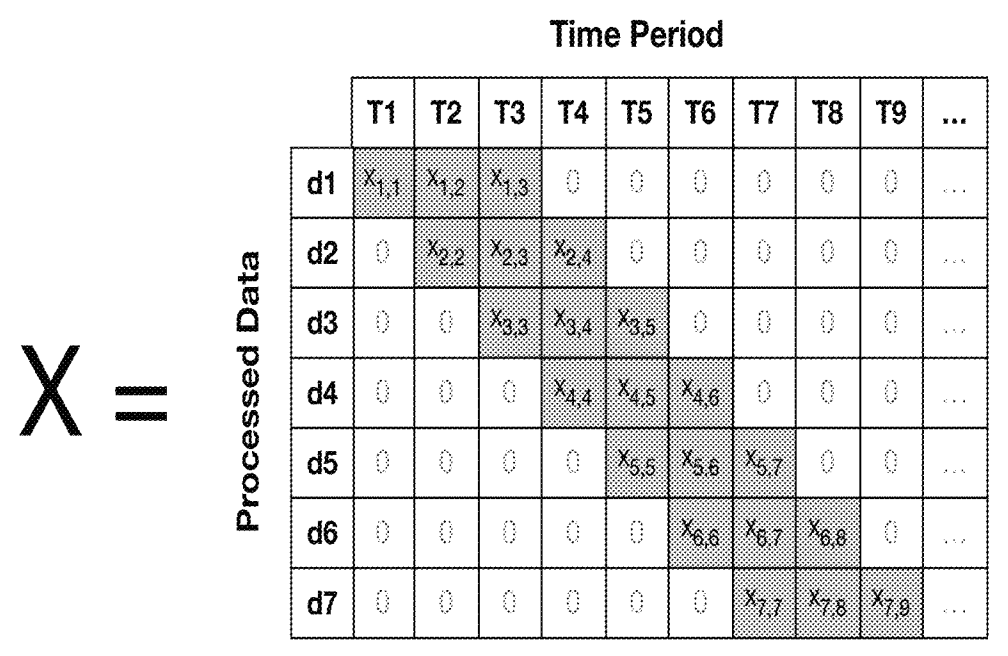

FIG. 4 illustrates a matrix "X" that defines the removals from the queue. Specifically, matrix X, shown in FIG. 4, is the variable matrix defining the removals from the queue such that X>=0. Thus, withdrawals must be positive in X. In some embodiments, a constraint is applied such that the elementwise product of X*D=X, such that elements of X can only be non-zero where elements in D are 1. This is a linear constraint.

Where a $D_{MAX}$ matrix is used, we apply a $X<=D_{MAX}$ constraint, meaning removals from a queue are limited.

Matrix $A_{CS}$ defines the number of available data items in each queue stream as the cumulative sum along columns of A-X:

$A_{CS}$=cumsum(A-X), where 'cumsum' is the cumulative column-sum

Figure 5:
FIG. 5 illustrates an example two-dimensional matrix configured in accordance with some embodiments.

FIG. 5 illustrates an example two-dimensional matrix configured in accordance with some embodiments. The quantity A-X, shown in FIG. 5, illustrates inspection of the first few fields. The direction of the cumulative sum is indicated by the arrow.

For this example, the constraints are:
Row 1:

$0-x_{1,1}>=0$, $0-x_{1,2}-x_{1,1}>=0$, $0-x_{1,3}-x_{1,2}-x_{1,1}>=0$

Row 2:

$20-x_{2,2}>=0$, $20-x_{2,3}-x_{2,2}>=0$, $20-x_{2,4}-x_{2,3}-x_{2,2}>=0$,

However, as the problem is represented in matrix notation, the expression may be written: $A_{CS}>=0$. That constraint simply states that data must exist in the queue in order to remove it.

Constraints on $A_{CS}$ may be placed such that the total buffer cannot exceed a certain maximum: $A_{CS}$<BUFFER_MAX. This is relevant in storage/memory limited applications.

Constraints may also be placed on the final column vector of $A_{CS}$, with the notation $A_{CS}[:,-1]$. Setting that final column vector to zero forces all queues to be processed:

$A_{CS}[:,-1]==0$

Figure 6:
FIG. 6 illustrates removal of example data entries from the rows of the two-dimensional matrix.

Finally, piecing together our objective, a measure of the total data items removed from all queues is determined. To this end, CONSUMED_ITEMS is defined as the row-sum of X. FIG. 6 illustrates removal of example data entries from the rows of the two-dimensional matrix.

Figure 7:
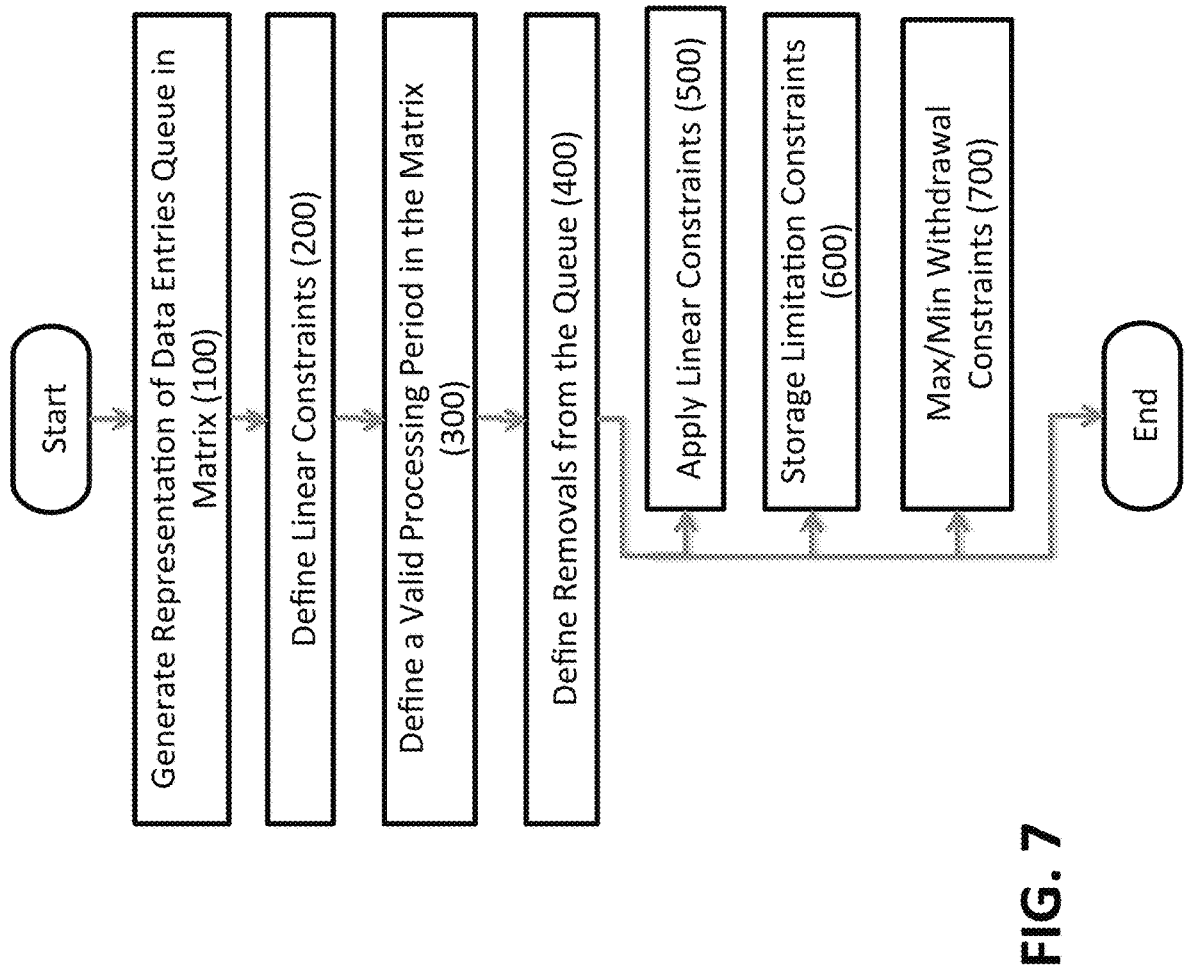
FIG. 7 illustrates a flow sequence for processing data entries in accordance with some embodiments.

FIG. 7 illustrates a flow sequence for processing data entries in accordance with some embodiments. The process generates a representation of a two-dimensional matrix, for storage in memory, of the data entries (FIG. 7, 100). Based on the application (e.g., parameters received from the application program), the process defines linear constraints by defining constraints in the matrix D, such as $D_{MAX}$ (FIG. 7, 200). The process defines a valid processing period in the matrix (FIG. 7, 300). Next, by annotating the matrix, the process defines removals from the queue (FIG. 7, 400). Rules, which define priority to process the data entries in the queue, include, but are not limited to: applying linear constraints; applying constraints around a maximum storage limitations (i.e., storage limitation constraints), and applying minimum and maximum withdrawal constraints (FIGS. 7, 500, 600 and 700).

The embodiments disclosed herein are broadly applicable to queue management problems. Some applications includes Tax Loss Carry Forward scenarios, and trading of stock for tax optimization.

The embodiments disclosed herein include a real-time data management control system.

The embodiments disclosed herein further include in a real-time data management control system, where forecasts about future buffers influence immediate actions.

Application for the Embodiments in Data Buffers Management:

To achieve a FIFO objective, data entries should come out of the queue as quickly as possible. This may be represented by taking the sum of the cumulative sum of the items processed in each time interval. The sum of the cumulative sum will be larger when items are processed earlier, thus we seek to maximize this value.

Maximize sum(cumsum(CONSUMED_ITEMS))

To achieve a LIFO objective, older entries are managed to reside in the queue for as long as possible. This may be represented by minimizing the sum of the cumulative sum of the items processed in each interval as the sum of the cumulative sum will be smaller when processing is deferred.

Minimize sum(cumsum(CONSUMED_ITEMS))

Application of Computer-Implemented Technique for Calculation of Tax Carry Forward Tax Loss Carry Forward policies differ widely from country to country. In Tax Loss Carry Forward, past accounting losses can be used to offset taxes on future earnings. In most instances, the ability for past losses to offset future earnings is limited to a certain number of years. For example, if losses can be carried forward for 5 years, losses in Year 1 can be offset until Year 5, and losses in Year 2 can be offset until Year 6. This creates a number of loss streams, each of which needs to be tracked across every year.

Traditional implementations use a combination of IF-ELSE statements or other esoteric functions such as Microsoft Excel's OFFSET, which is notoriously difficult to use and error-prone. Further, every subtle rule change requires a new implementation or review of the calculations.

The methods below describe embodiments for software to perform these calculations.

From a Discount Cash Flow Model, Earnings Before Taxes (EBT) Profits (EBTP) and Losses (EBTL) are separated into two vectors. EBT=EBTP−EBTL. Zeros fill losses in the EBTP and zeros fill profits in EBTL. Mapping this to the embodiments described above, losses are treated as arrivals in the queue, as shown below in TABLE 1.

TABLE 1

| Variable | Y1 | Y2 | Y3 | Y4 | Y5 | Y6 | Y7 | ... |
|---|---|---|---|---|---|---|---|---|
| Earnings Before Taxes | 10 | −20 | 4 | 15 | −1 | 2 | 30 | ... |
| Earnings Before Taxes, Profits (EBTP) | 10 | 0 | 4 | 15 | 0 | 2 | 30 | ... |
| Earnings Before Taxes, Losses (EBTL) | 0 | −20 | 0 | 0 | −1 | 0 | 0 | ... |

A withdrawal matrix, D, defines the valid periods to offset revenue with losses, as shown in FIG. 8. Here, the number of periods is three years and as such each row contains three elements with value of 1 with the rest zeros. This matrix is upper triangular. Rows represent distinct cash flow streams and columns represent when additions or withdrawals can be made into those streams. This is country-specific and may take on the form of a banded-matrix (carry forward limited to N years), upper-triangular (unlimited carry forward), or any other form.

Diagonal matrix A, shown in FIG. 9, is filled with EBTL (arrival in queues). Matrix X, shown in FIG. 10, is the variable matrix defining the withdrawal amount from the cash flow streams. X>=0 (defines withdrawals to be positive in X). A constraint is applied such that the elementwise product of X*D=X, such that X can only have non-zero values when D is 1. This is a linear constraint.

Matrix $A_{CS}$, shown in FIG. 11, defines the available funds in each stream as the cumulative sum along columns of A-X:

$A_{CS}$=cumsum(A-X), where 'cumsum' is the cumulative column-sum

The quantity A-X is shown in FIG. 11 for inspection of the first few fields. The direction of the cumulative sum is indicated by the arrow shown in FIG. 11.

For this example problem, we would set up these constraints:

Row 1:

$0-x_{1,1}>=0$, $0-x_{1,2}-x_{1,1}>=0$, $0-x_{1,3}-x_{1,2}-x_{1,1}>=0$

Row 2:

$20-x_{2,2}>=0$, $20-x_{2,3}-x_{2,2}>=0$, $20-x_{2,4}-x_{2,3}-x_{2,2}>=0$,

However, as the problem is represented in matrix notation, it may be expressed as: $A_{CS}>=0$. That constraint simply states that money must be available in each stream in order to withdraw.

Figure 12:
FIG. 12 illustrates an example matrix as the row-sum of matrix X.

Finally, piecing together our objective, a measure of earnings is sought. CONSUMED_LOSSES is defined to offset accounting profits as the row-sum of X as shown in FIG. 12.

CONSUMED_LOSSES can also be limited using a constraint that will cap the amount of revenue that can be offset by losses, LOSS_MAX: CONSUMED_LOSSES<=LOSS_MAX.

Net taxable earnings are the earnings profits before taxes (EBTP) minus these consumed losses: NET_TAXABLE_EARNINGS=EBTP−CONSUMED_LOSSES The objective is to minimize the net taxable earnings. As earnings occur over multiple years, this is compressed to a scalar. NPV may be used to express a preference for tax optimization in early years. The behavior of the model is not particularly sensitive to the choice of this penalty function.

Objective: Minimize NPV(NET_TAXABLE_EARNINGS). The NPV function also requires a discount rate, but is not shown here.

In this example, a First-In First-Out (FIFO) policy is achieved, although this is a result of the optimization rather than being explicitly enforced.

The innovation disclosed herein provides for a data buffer management scheme that explicitly satisfies the objectives. The innovation disclosed herein further provides for implementing a buffer management system as a convex optimization with linear constraints using linear or convex objectives. The use of optimization permits use of a functional programmatic interface to the algorithm, rather than an imperative one. The innovation disclosed herein further provides for implementing a buffer management system for tax loss carry forward calculations.

The inventions disclosed analyze the buffer management problem as a constraint based optimization, and rely on highly-efficient algorithms to determine feasibility and a solution. The constraint-based optimization provides for a testable framework for calculating sub-problems from the parent solution. Sub-problems from the parent solution are formed by the addition of constraints and customization of objectives. These input mechanisms, expressed in matrix notation, are easy to understand and can be visualized for review.

Additional System Architecture Examples

Figure 13:
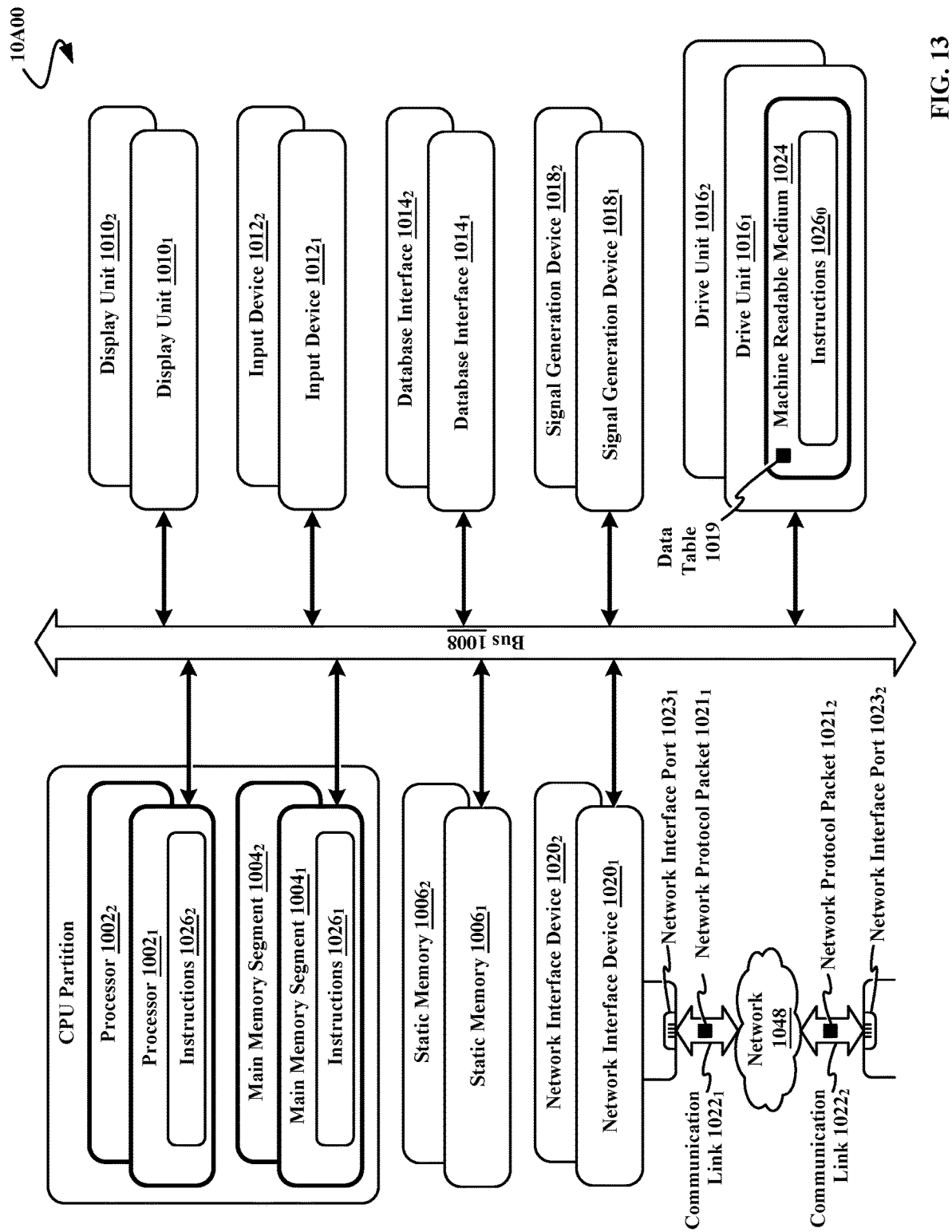
FIG. 13 depicts a diagrammatic representation of a machine in the exemplary form of a computer system within which a set of instructions for causing the machine to perform any one of the methodologies discussed above may be executed.

FIG. 13 depicts a diagrammatic representation of a machine in the exemplary form of a computer system 10A00 within which a set of instructions for causing the machine to perform any one of the methodologies discussed above may be executed. In alternative embodiments, the machine may comprise a network router, a network switch, a network bridge, a personal digital assistant (PDA), a cellular telephone, a web appliance, or any machine capable of executing a sequence of instructions that specify actions to be taken by that machine.

The computer system 10A00 includes a CPU partition having one or more processors (e.g., processor $1002_1$, processor $1002_2$, etc.), a main memory comprising one or more main memory segments (e.g., main memory segment $1004_1$, main memory segment $1004_2$, etc.), and one or more static memories (e.g., static memory $1006_1$, static memory $1006_2$, etc.), any of which components communicate with each other via a bus 1008. The computer system 10A00 may further include one or more video display units (e.g., display unit $1010_1$, display unit $1010_2$, etc.) such as an LED display, or a liquid crystal display (LCD), a cathode ray tube (CRT), etc. The computer system 10A00 can also include one or more input devices (e.g., input device $1012_1$, input device $1012_2$, alphanumeric input device, keyboard, pointing device, mouse, etc.), one or more database interfaces (e.g., database interface $1014_1$, database interface $1014_2$, etc.), one or more disk drive units (e.g., drive unit $1016_1$, drive unit $1016_2$, etc.), one or more signal generation devices (e.g., signal generation device $1018_1$, signal generation device $1018_2$, etc.), and one or more network interface devices (e.g., network interface device $1020_1$, network interface device $1020_2$, etc.).

The disk drive units can include one or more instances of a machine-readable medium 1024 on which is stored one or more instances of a data table 1019 to store electronic information records. The machine-readable medium 1024 can further store a set of instructions $1026_0$ (e.g., software) embodying any one, or all, of the methodologies described above. A set of instructions $1026_1$ can also be stored within the main memory (e.g., in main memory segment $1004_1$). Further, a set of instructions $1026_2$ can also be stored within the one or more processors (e.g., processor $1002_1$). Such instructions and/or electronic information may further be transmitted or received via the network interface devices at one or more network interface ports (e.g., network interface port $1023_1$, network interface port $1023_2$, etc.). Specifically, the network interface devices can communicate electronic information across a network using one or more optical links, Ethernet links, wireline links, wireless links, and/or other electronic communication links (e.g., communication link $1022_1$, communication link $1022_2$, etc.). One or more network protocol packets (e.g., network protocol packet $1021_1$, network protocol packet $1021_2$, etc.) can be used to hold the electronic information (e.g., electronic data records) for transmission across an electronic communications network (e.g., network 1048). In some embodiments, the network 1048 may include, without limitation, the web (i.e., the Internet), one or more local area networks (LANs), one or more wide area networks (WANs), one or more wireless networks, and/or one or more cellular networks.

The computer system 10A00 can be used to implement a client system and/or a server system, and/or any portion of network infrastructure.

It is to be understood that various embodiments may be used as, or to support, software programs executed upon some form of processing core (such as the CPU of a computer) or otherwise implemented or realized upon or within a machine or computer readable medium. A machine-readable medium includes any mechanism for storing or transmitting information in a form readable by a machine (e.g., a computer). For example, a machine-readable medium includes read-only memory (ROM), random access memory (RAM), magnetic disk storage media, optical storage media, flash memory devices, or any other type of non-transitory media suitable for storing or transmitting information.

A module as used herein can be implemented using any mix of any portions of the system memory, and any extent of hard-wired circuitry including hard-wired circuitry embodied as one or more processors (e.g., processor $1002_1$, processor $1002_2$, etc.).

What is claimed is:

1. A computer-implemented method for managing processing of data entries in a data buffer, comprising:
   storing a plurality of data entries in a data buffer;
   storing, in computer memory, using at least one processor, a representation of a two-directional matrix, and annotating the two-directional matrix to mark the data arrivals as a plurality of entries in the two-directional matrix such that the entries are arranged in a row direction of the two-directional matrix, based on a time of receipt of the data arrivals, and in a column direction of the two-directional matrix to uniquely identify the data entries;
   annotating, using a processor unit and the memory, the representation of the two-directional matrix the data entries to define a valid processing period for the data entries;
   processing the data entries in the data buffer, using the processor unit and the memory, by removing the data entries from the data buffer, marked for processing in the two-dimensional matrix during the valid processing period, by annotating the matrix, labeled as $A_{CS}$, to define the number of available entries as a cumulative sum along the columns, A-X:
   $A_{CS}$=cumsum(A-X), where 'cumsum' is the cumulative column-sum; and
   processing, using the processor unit and the memory, to determine the entries removed from the data buffer as defined by the row-sum of X.

2. The computer-implemented method as set forth in claim 1, wherein the processing of the data arrivals in the data buffer comprises removing entries from the data buffer with a dispatch policy that comprises a first-in-first-out policy.

3. The computer-implemented method as set forth in claim 1, wherein the processing of the data arrivals in the data buffer comprises removing entries from the data buffer with a dispatch policy that comprises a last-in-first-out policy.

4. The computer-implemented method as set forth in claim 1, wherein annotating, using the processor unit and the memory, the two-directional matrix, labeled X, and applying a constraint on the removals of the data entries such that the elementwise product of X*D=X, such that X can only have non-zero values when D is 1.

5. The computer-implemented method as set forth in claim 4, further for annotating, using the processor unit and the memory, the two-directional matrix, labeled as $D_{MAX}$, and applying a constraint on the removals that signify that removals of the data entries from the data buffer are limited such that X<=$D_{MAX}$ constraint.

6. The computer-implemented method as set forth in claim 1, further for specifying a time-expiration on data processing in the valid processing period.

7. The computer-implemented method as set forth in claim 1, further for applying a constraint on $A_{CS}$ such that a total number of data entries cannot exceed a certain maximum: $A_{CS}$<BUFFER_MAX, during the valid processing period.

8. The computer-implemented method as set forth in claim 1, further for applying a constraint on a final column vector of $A_{CS}$ such that $A_{CS}$[:,−1]=0 sets the final column vector to zero so as to force all queues to be processed.

9. The computer-implemented method as set forth in claim 1, further comprising:
   receiving financial data on accounting losses, earnings and tax constraints that define a number of years to apply losses to earnings; and
   executing the process of claim 1 so as to solve a tax loss carry forward scenario.

10. The computer-implemented method as set forth in claim 1, further comprising:
    receiving financial data on accounting losses, earnings and tax constraints that define a number of years to apply losses to earnings; and executing the process of claim 1 so as to solve a tax loss carry forward scenario.

11. A computer-readable medium comprising a plurality of instructions, which when executed by a processor unit and memory, manage processing of data entries in a data buffer, computer-readable medium comprising instructions for:

storing a plurality of data entries in a data buffer;

storing a representation of a two-directional matrix, and annotating the two-directional matrix to mark the data arrivals as a plurality of entries in the two-directional matrix such that the entries are arranged in a row direction of the two-directional matrix, based on a time of receipt of the data arrivals, and in a column direction of the two-directional matrix to uniquely identify the data entries;

annotating the representation of the two-directional matrix the data entries to define a valid processing period for the data entries;

processing the data entries in the data buffer, using the processor unit and the memory, by removing the data entries from the data buffer, marked for processing in the two-dimensional matrix during the valid processing period, by annotating the matrix, labeled as $A_{CS}$, to define the number of available entries as a cumulative sum along the columns, A-X:

$A_{CS}$=cumsum(A-X), where 'cumsum' is the cumulative column-sum; and processing, using the processor unit and the memory, to determine the entries removed from the data buffer as defined by the row-sum of X.

12. The computer-readable medium as set forth in claim 11, wherein the processing of the data arrivals in the data buffer comprises removing entries from the data buffer with a dispatch policy that comprises a first-in-first-out policy.

13. The computer-readable medium as set forth in claim 11, wherein the processing of the data arrivals in the data buffer comprises removing entries from the data buffer with a dispatch policy that comprises a last-in-first-out policy.

14. The computer-implemented method as set forth in claim 11, wherein annotating the two-directional matrix, labeled X, and applying a constraint on the removals of the data entries such that the elementwise product of X*D=X, such that X can only have non-zero values when D is 1.

15. The computer-readable medium as set forth in claim 14, further for annotating the two-directional matrix, labeled as $D_{MAX}$, and applying a constraint on the removals that signify that removals of the data entries from the data buffer are limited such that X<=$D_{MAX}$ constraint.

16. The computer-readable medium as set forth in claim 11, further for specifying a time-expiration on data processing in the valid processing period.

17. The computer-readable medium as set forth in claim 11, further for applying a constraint on $A_{CS}$ such that a total number of data entries cannot exceed a certain maximum: $A_{CS}$<BUFFER_MAX, during the valid processing period.

18. The computer-readable medium as set forth in claim 11, further for applying a constraint on a final column vector of $A_{CS}$ such that $A_{CS}$[:,−1]=0 sets the final column vector to zero so as to force all queues to be processed.

19. A data processing system for managing processing of data entries in a data buffer, comprising:

a data buffer for storing a plurality of data entries;

a processor unit, comprising at least one processor, and memory to:

store a representation of a two-directional matrix, and to annotate the two-directional matrix to mark the data arrivals as a plurality of entries in the two-directional matrix such that the entries are arranged in a row direction of the two-directional matrix, based on a time of receipt of the data arrivals, and in a column direction of the two-directional matrix to uniquely identify the data entries;

annotate the representation of the two-directional matrix the data entries to define a valid processing period for the data entries;

process the data entries in the data buffer by removing the data entries from the data buffer, marked for processing in the two-dimensional matrix during the valid processing period, to annotate the matrix, labeled as $A_{CS}$, to define the number of available entries as a cumulative sum along the columns, A-X:

$A_{CS}$=cumsum(A-X), where 'cumsum' is the cumulative column-sum; and process to determine the entries removed from the data buffer as defined by the row-sum of X.

20. The data processing system as set forth in claim 19, wherein to annotate the two-directional matrix, labeled X comprises to apply a constraint on the removals of the data entries such that the elementwise product of X*D=X, such that X can only have non-zero values when D is 1.

\* \* \* \* \*